(12) United States Patent
McAleenan

(10) Patent No.: US 10,752,274 B2
(45) Date of Patent: Aug. 25, 2020

(54) WHEELED BACKPACK CARGO HAULER

(71) Applicant: Michael McAleenan, Georgetown, ME (US)

(72) Inventor: Michael McAleenan, Georgetown, ME (US)

(73) Assignee: Michael McAleenan, Woolwich, ME (US)

( * ) Notice: Subject to any disclaimer, the term of this patent is extended or adjusted under 35 U.S.C. 154(b) by 0 days.

(21) Appl. No.: 15/284,438

(22) Filed: Oct. 3, 2016

(65) Prior Publication Data

US 2017/0096156 A1  Apr. 6, 2017

Related U.S. Application Data

(60) Provisional application No. 62/235,678, filed on Oct. 1, 2015.

(51) Int. Cl.
| | |
|---|---|
| *B62B 1/00* | (2006.01) |
| *B62B 1/12* | (2006.01) |
| *B62B 13/18* | (2006.01) |
| *B62B 5/06* | (2006.01) |
| *B62B 1/20* | (2006.01) |

(52) U.S. Cl.
CPC ............... *B62B 1/12* (2013.01); *B62B 1/208* (2013.01); *B62B 5/065* (2013.01); *B62B 5/067* (2013.01); *B62B 5/068* (2013.01); *B62B 13/18* (2013.01); *B62B 2202/26* (2013.01); *B62B 2205/02* (2013.01); *B62B 2205/06* (2013.01)

(58) Field of Classification Search
CPC ....... B62B 7/066; B62B 3/027; B62B 5/0023; B62B 3/02; B62B 1/125; B62B 5/068; B62B 13/16; B62B 1/208; B62B 1/12; A47B 31/04; A47B 43/00
See application file for complete search history.

(56) References Cited

U.S. PATENT DOCUMENTS

| | | | | |
|---|---|---|---|---|
| 2,772,890 | A * | 12/1956 | Gastright | B62B 1/12 280/40 |
| 2,872,202 | A * | 2/1959 | Tripoli | B62B 1/12 280/654 |
| 3,580,592 | A * | 5/1971 | Schrecengost | B62B 13/16 280/20 |
| 3,861,695 | A * | 1/1975 | Shourek | B62B 1/125 211/195 |
| 3,912,290 | A * | 10/1975 | Rich | B62B 3/02 280/19 |

(Continued)

*Primary Examiner* — Hau V Phan
(74) *Attorney, Agent, or Firm* — West Hill Technology Counsel

(57) ABSTRACT

A transport device in the form of a cart or cargo hauler is foldable to permit the device to be used in transport applications with narrow or constrained parameters. The device may be loaded or unloaded when folded or unfolded, providing a flexible implementation that improves ease of transport. The device may include one or more wheels or skis depending on a desired application. Handles may be provided that telescope and/or fold to provide a compact folded configuration. The transport device may be folded compactly so as to be carried with a backpack or shoulder harness. The handles may be attached to waist belt or shoulder harness to permit hands-free transport. The device is suitable for use over rough back country terrain or sand.

15 Claims, 12 Drawing Sheets

(56) References Cited

U.S. PATENT DOCUMENTS

| | | | | | |
|---|---|---|---|---|---|
| 4,619,464 | A | * | 10/1986 | Hwang | B62B 3/02 16/113.1 |
| 4,740,010 | A | * | 4/1988 | Moskovitz | A47B 31/04 108/170 |
| 5,040,809 | A | * | 8/1991 | Yang | B62B 3/02 280/42 |
| 6,443,481 | B1 | * | 9/2002 | Stravitz | A47B 31/04 211/201 |
| 6,685,199 | B2 | * | 2/2004 | Stravitz | A47B 31/04 211/201 |
| 6,851,564 | B2 | * | 2/2005 | Ng | A47B 43/00 108/171 |
| 7,243,939 | B2 | * | 7/2007 | Lowe | B62B 1/208 280/42 |
| 8,523,197 | B2 | * | 9/2013 | Baatz | B62B 3/025 280/42 |
| 2002/0153707 | A1 | * | 10/2002 | Kady | B62B 1/125 280/652 |
| 2006/0097487 | A1 | * | 5/2006 | Stuart | B62B 3/027 280/651 |
| 2007/0075105 | A1 | * | 4/2007 | Petrin | B62B 5/068 224/153 |
| 2008/0042379 | A1 | * | 2/2008 | Amran | B62B 5/0023 280/30 |
| 2010/0264628 | A1 | * | 10/2010 | Ohnishi | B62B 7/066 280/651 |
| 2012/0306181 | A1 | * | 12/2012 | Clifton | B62B 5/0023 280/647 |

\* cited by examiner

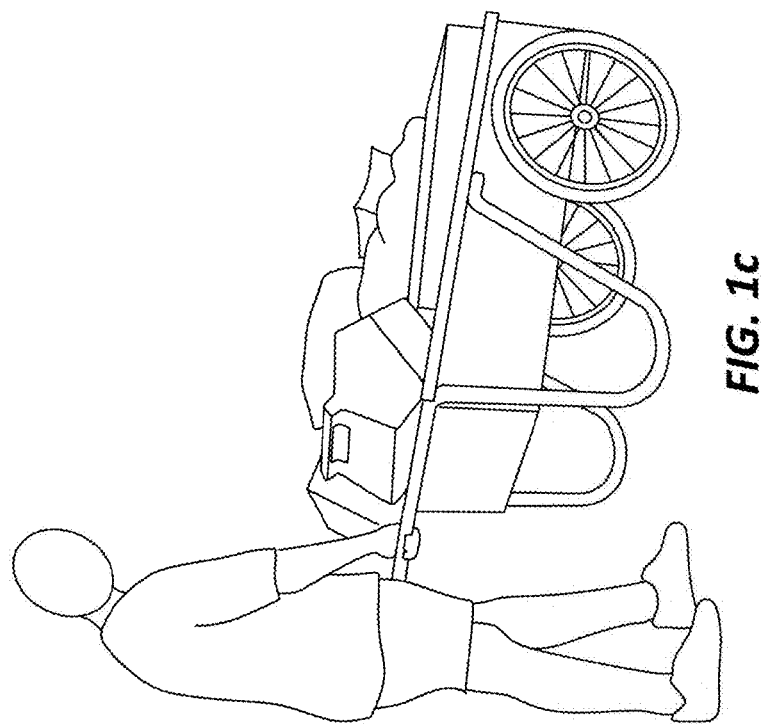
FIG. 1c
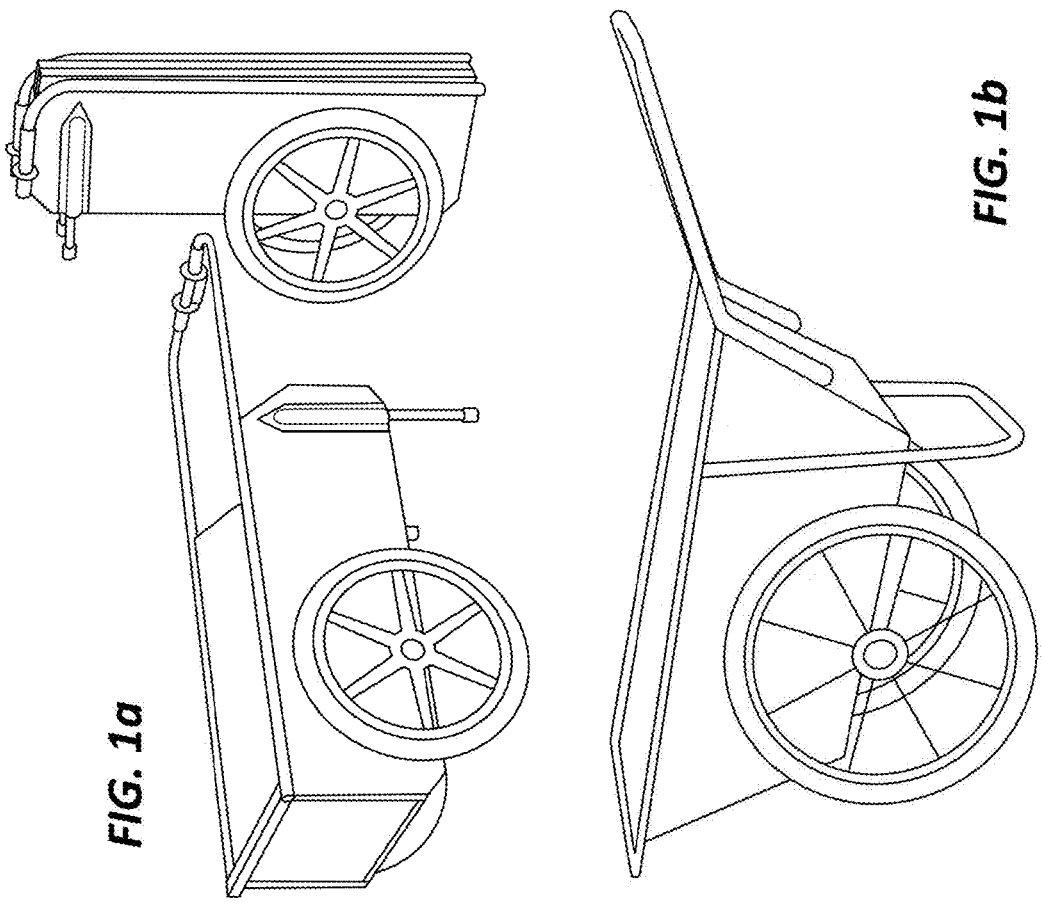
FIG. 1a
FIG. 1b

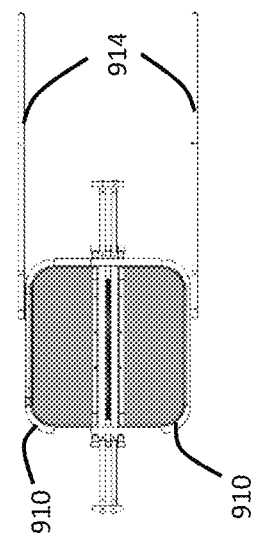
FIG. 9c
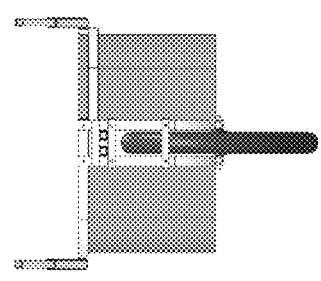
FIG. 9b
FIG. 9g
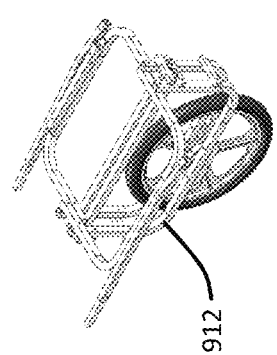
FIG. 9f
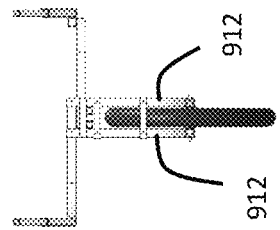
FIG. 9e
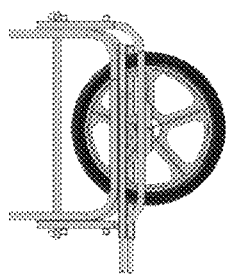
FIG. 9k
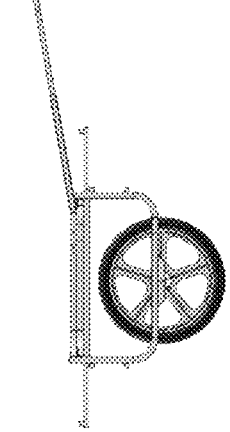
FIG. 9j
FIG. 9i
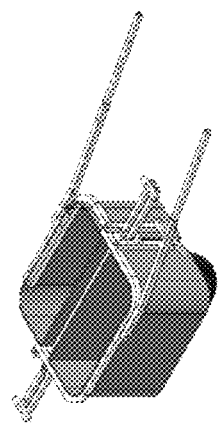
FIG. 9a
FIG. 9d
FIG. 9h

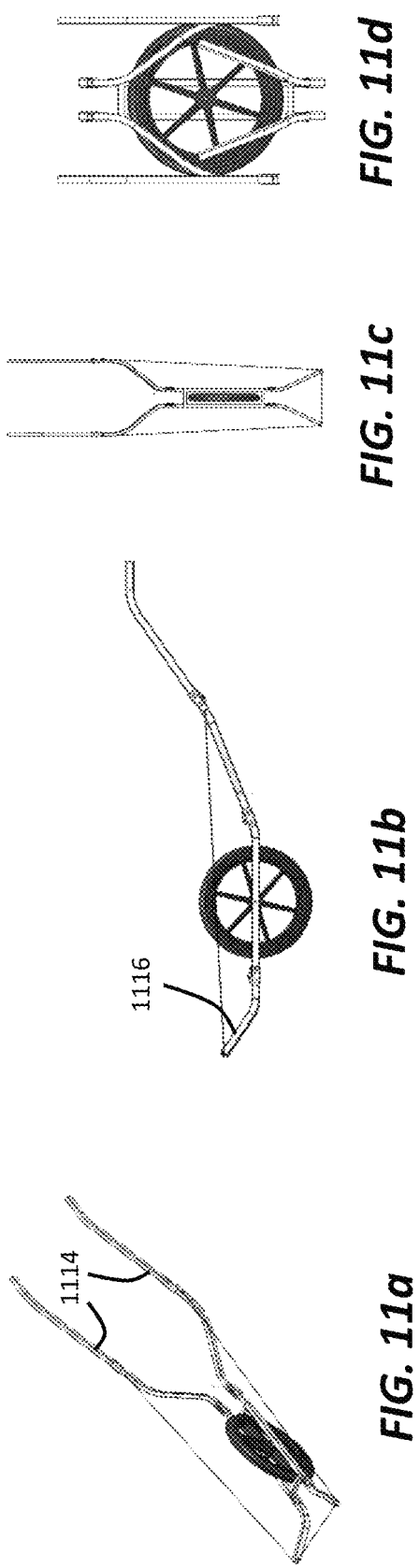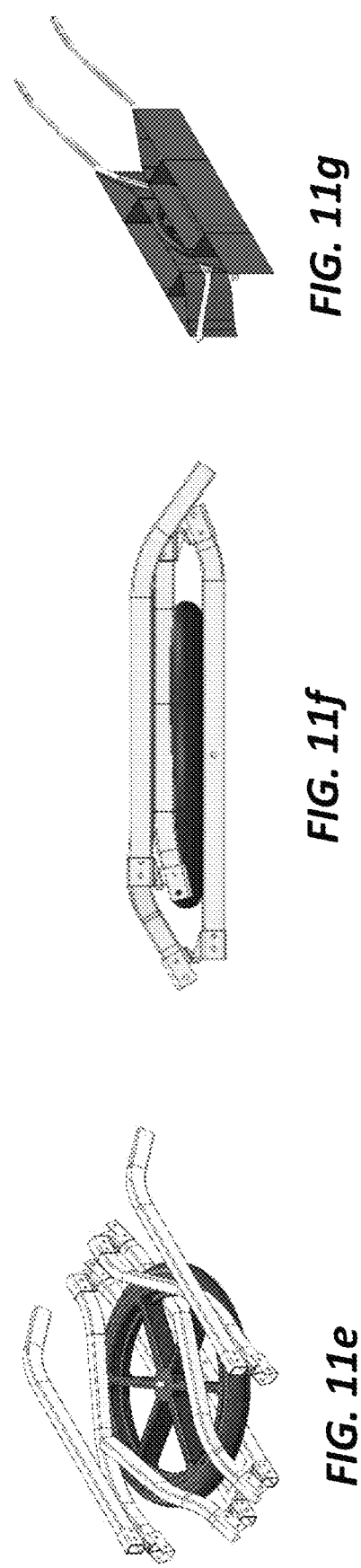

WHEELED BACKPACK CARGO HAULER

STATEMENT REGARDING FEDERALLY SPONSORED RESEARCH OR DEVELOPMENT (Not Applicable)

BACKGROUND

The commercial and recreational marine industries are constantly moving cargo to and from vessels. Supplies are often located at significant distances from where vessels are docked or moored. Commercial vessels typically have the bulk of consumable stores sub-contracted to companies which re-stock the vessel upon its arrival in port. However, crew are often dispatched for specific items. These items can be numerous, bulky and/or heavy.

Unlike commercial vessels, recreational vessels which include; chartered/private captain-crewed vessels, year round/month/weeks cruisers, weekend and day boaters, are responsible for restocking their own vessels. For chartered and cruisers, restocking often involves walking, bicycling, scooter or taxi cabs, and dedicated and multiple trips. Provisions may include food, household supplies, gasoline for dinghy engines, water, vehicle or motor parts, sails or repair tools and hardware, as examples.

Weekend and day boaters typically transport gear from a vehicle to a docked or moored vessel. It is also likely that on occasion it may be helpful to transport gear while in port.

Other areas where items are transported in constrained circumstances include forest firefighters, park rangers, trail maintenance crews, and remote EMS personnel, to name a few examples. Additional recreational applications include campers, beach goers, RV'ers, remote hunting/fishing camps and outdoorsmen.

Devices that are currently available for the above applications are aluminum and plastic utility carts. Some examples of these carts are illustrated in FIG. 1. FIG. 1a illustrates an aluminum folding marine cart. Other products, such as those illustrated in FIGS. 1b and 1c, include several variations on garden carts with either plastic or fiberglass tubs on wheels.

The cart illustrated in FIG. 1a may include optional adapters for both bicycles and tractors. The cart design shown in FIG. 1 may be limited in the maximum travel speed of the cart.

SUMMARY

A transport device for transporting loads over a transport surface is described herein, where the transport device includes a support member for supporting the device on the transport surface, a frame coupled to the support member, the frame being configured to support a load, a handle connected to the frame and a rotating joint in the frame and configured to permit at least some portions of the frame to fold to reduce a size of the frame.

The device support member may include one or more of a wheel, a ski or a skid. A plurality of support members may be provided, each of which may be one or more of a wheel, ski or skid. The handle may be telescoping, collapsible or foldable. The frame is supported by the support member for transport. The device may include an attachment device for attaching the handle to a user for hands-free transport. The attachment device may be one or more of a waist belt or a shoulder harness. The rotating joint may be configured to be actuated to pivot about a point of the frame. Another rotating joint may be provided that is coupled to the rotating joint, and configured to be actuated when the rotating joint is actuated.

The support member may be configured with at least two wheels, and the two wheels may be drawn closer to each other when the frame is folded. A rotating handle beam can be provided that is connected to the rotating joint, the rotating handle beam being configured to receive an urging force to actuate the rotating joint. The device may further include a load compartment suspended from the frame.

A method for transporting loads on a transport surface may be provided in accordance with the present description. The method may include providing a transport device with a rotating joint in a frame of the transport device and a support member for supporting the transport device on the transport surface, actuating the rotating joint to fold or unfold the transport device and transporting a load with the transport device in either the folded or unfolded configuration.

Some methods may include actuating the rotating joint to unfold the transport device, loading the transport device with the load and actuating the rotating joint to fold the transport device. Some methods may implement the support member as one or more of a wheel, a ski or a skid. The handles may be extended, retracted, folded or unfolded in accordance with some disclosed methods. The methods may also include attaching a handle of the transport device to one or more of a waist belt or a shoulder harness for a user to transport the load in a hands-free mode.

Some methods include actuating the rotating joint to fold the transport device and transporting the load above the transport surface. These methods may use the transport device as a tote that is carried by a user.

A foldable transport device for transporting loads over a transport surface is also described. The device includes a support member with a largest dimension for supporting the device on the transport surface, a frame coupled to the support member, the frame being configured to support a load, a handle connected to the frame and a rotating joint in the frame and configured to be actuated to permit the support member to be folded such that the largest dimension aligns with at least portions of the frame to obtain a compact folded configuration for the foldable transport device. The compact folded configuration is sufficiently compact to be carried on a user's back or around a user's shoulder.

BRIEF DESCRIPTION OF THE SEVERAL VIEWS OF THE DRAWINGS

The disclosure is described in greater detail below, with reference to the accompanying drawings, in which:

FIGS. 1a, 1b and 1c are illustrations of known transport devices;

FIGS. 9a, 9b, 9c, 9d, 9e, 9f, 9g, 9h, 9i, 9j and 9k are different views of another example cargo hauler in both a folded and unfolded configuration and with some views showing cargo compartment containers;

FIGS. 11a, 11b, 11c, 11d, 11e, 11f and 11g are different views of an example cargo hauler in both a folded and unfolded configuration.

DETAILED DESCRIPTION

Figure 2C:
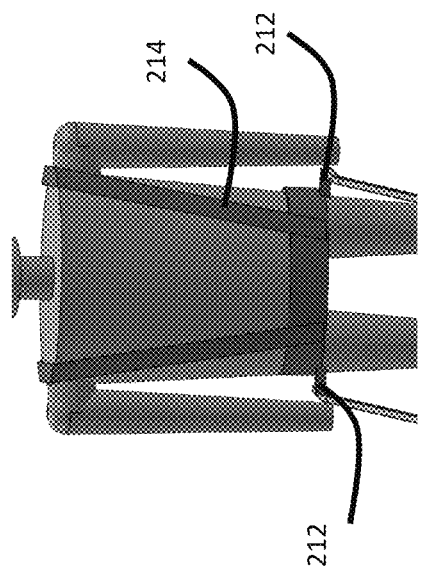
FIGS. 2a, 2b and 2c are illustrations of a transport device used in hands-free mode.

The entire disclosure of U.S. patent application Ser. No. 62/235,678, filed Oct. 1, 2015, entitled "WHEELED BACKPACK CARGO HAULER" is hereby incorporated herein by reference.

A cargo hauler that is wheeled and collapsible is described. The cargo hauler can be provided as a cart that folds with gear in the cart for use as a tote, an advantage that is unavailable in known carts. A loaded, folded cart can be unfolded and configured to be wheeled to transport the load. For example, if going from the house to the car, the loaded cart is folded, and placed in the car trunk. At a marina, the loaded cart is taken out of the trunk, unfolded and may be easily wheeled along a pier or quay to a boat, for example. There is no need to load and unload the cart during these transitions.

Some embodiments described below include a waist belt and/or shoulder straps to permit hands free hauling. Other embodiments provide a folding feature, which permits the cargo hauler to be used as a backpack, while loaded or unloaded. The cargo hauler may thus be used as a backpack, and converted to/from a cargo hauler. The cargo hauler may provide 67-75% weight savings over known carts. When folded, the cargo hauler may take up half the unfolded storage volume, which can be important for cruisers. The cargo hauler described here can be used with many types of vehicles, including scooters, bicycles and tractors. Adapters are provided to permit the cargo hauler to be attached to vehicles for transport.

The cargo hauler may be used with high speed vehicles, such as ATV's, Rokon's and lower speed dirt bikes. The cargo hauler is configurable to operate as a beach or lawn chair. The folding design of the cargo hauler permits use in confined areas for transport, such as small boat transport such as kayaks, canoes and row boats. Hunting applications permit the cargo hauler to be used to transport game such as deer, bear or fowl. The cargo hauler is useable in rough terrain where roads may be unavailable or not easily accessed, which is advantageous in camping or hunting applications. The cargo hauler may also be used for emergency applications to transport equipment in confined spaces, such as may be useful for EMS and for hands free transport of firefighting equipment, for example. Another useful application is for hands free cargo transport for parents, permitting parents to hold children, as well as permitting children/handicapped or disabled persons to be able to move/pick-up/discard items.

The cargo hauler design provides the advantage of transitioning from wheeling use, such as a cart usage, to use as a tote, while permitting cargo to remain loaded in the cart. Previous known carts typically operate with the user unloading cargo to fold the cart, and then reloading the cart after unfolding.

The cargo hauler is also capable of hands free hauling. Such useful operation is possible with the use of a backpacker's waist belt and/or the use of a shoulder harness/shoulder strap and/or straps. The straps or harness can be used with the folded cargo hauler for use as a day pack/backpack or as a carry tote. The cargo hauler may also be folded and placed in knapsack or backpack for transport and can also be transported using the straps or harness as a shoulder strap to carry the cargo hauler.

The cargo hauler includes a rotating beam or beams connected to rotating beam handles, which may be oriented in a vertical or other direction. The rotating beam can be actuated to fold/unfold the cargo hauler. The rotating beam may be connected to a front or a back of the cargo hauler, or both, and may be individually actuated to fold/unfold the cargo hauler.

Handles may be provided with the cargo hauler. The handles may be located outside of the wheels in a cart configuration to increase operator control and cart stability during hauling. The handles may extend and/or fold, with the folded or unfolded configurations of the cargo holder. Thus, a collapsed or folded cart configuration may be wheeled with the user gripping the handle(s) in an extended or retracted configuration. That is, there is no need to unfold the cart to wheel it to a given location. For example, the user may extend the folded cart handles and wheel the folded cart to a desired location where the cart may be loaded or unloaded. This feature permits loaded or unloaded cart access through areas with limited or narrow accessibility.

The cargo hauler may be configured to match a small boat deadrise or bottom geometry for stable and secure transport of a small boat. The hands free feature permits easy backwoods hauling of significant loads. The cargo hauler may also be configured with ski accessories for cross country or downhill skiing on snow during the winter. The ski accessories may be in addition to or to substitute for one or more wheels. The efficient and simple operating mechanisms of the cargo hauler, including the folding mechanisms, are lightweight and permit efficient folding/unfolding operation of the cargo hauler.

Figure 2B:
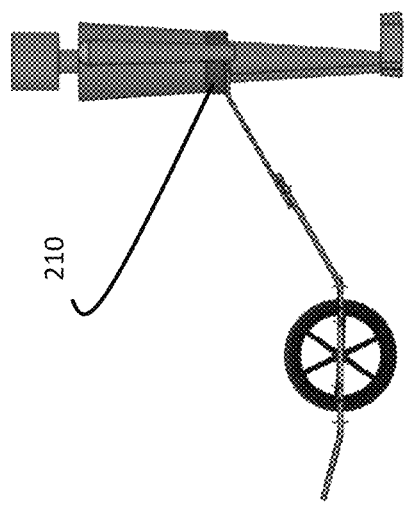
Figure 2A:
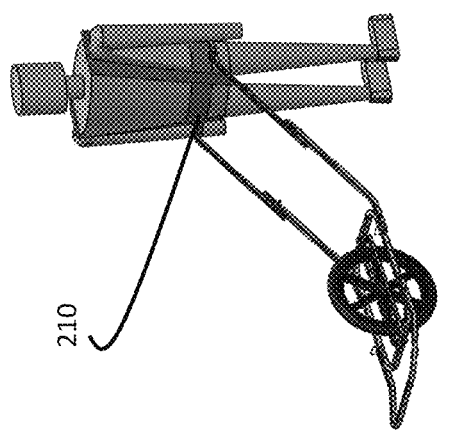

Referring now to FIGS. 2a, 2b and 2c, an embodiment of the cargo hauler with a waist belt 210 and a shoulder harness 214 are illustrated. Waist belt 210 and shoulder harness 214 are configured with attachment points 212 to connect the cargo hauler handles to the user for hands free transport. Additional harness attachment configurations permit direct attachment of the shoulder harness to cart handles to improve harness to cart pulling angles. These additional shoulder harness-to-handle attachments points may vary based on user height. Although the illustrated cargo hauler is single wheeled, it may also be configured to have additional wheels. Single wheeled cargo haulers may be used on improved traveling surfaces (roads, sidewalks, piers, docks, ect . . . ) and unimproved backwoods trails, or off road where no trails exist. The single wheeled hauler may thus be advantageous for use in narrow or rough terrain, where a multi-wheeled cargo hauler may be limited by its design width. Multi-wheeled cargo haulers may be advantageous for improved traveling surfaces due to their greater stability. Any of the hauler designs discussed here can have fixed or telescoping or fold out handles.

Single and dual wheel cart designs both may use waist belt 210 and/or shoulder straps or harness 214 (FIG. 2) for hands free hauling. Illustrated is hands free hauling for a single wheel cart design, similar waist belt 210 and/or harness 214 may be used for multi-wheel designs. Commercial harnesses are available from Cairns and cargo equipment and backpack suppliers. Commercial harness shoulder straps and waist belt have features that allow both shoulder straps 214 and belt 210 to attach independently to cart handles.

Referring now to FIGS. 3a-3g, a multi (two)-wheeled hauler design is illustrated. The illustrated hauler includes vertical beams 312 near a center of the hauler that permit compact folding operation, provide strength to carry hundreds of pounds of cargo and are connected to operate by one or more rotating beams 310 that use a moment to fold/unfold the cart. The use of the beams in a center of the hauler is not known in previous cart designs and provides several advantages for compact folding and efficiency of operation.

A distinctive feature of the hauler design is a direct load path from a bag support beam 314, through the wheel frame to tires and kickstands that react the load. The cargo hauler configuration in FIGS. 3a-3g includes rotating beam handles 310, which are two pieces of bent tubing located either side of the cart that connect to vertical rotating beams 312. To fold the cart, rotating beam handles 310 are urged upward, which displaces vertical rotating beams 312 downward. The process is reversed to unfold the cart, e.g., rotating beam handles 310 are urged downward to displace vertical rotating beams 312 upward. Vertical rotating beams 312 can be configured to be displaced upward as well as downward in a folding operation. Vertical rotating beam 312 can be composed of a single or multiple beams. Multiple beams can be adjacent or separated at some distance.

Figure 3A:
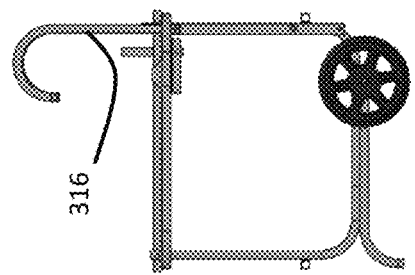
FIGS. 3a, 3b, 3c, 3d, 3e, 3f and 3g are different views of an example cargo hauler in both a folded and unfolded configuration.
Figure 3B:
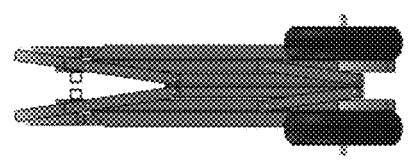
Figure 3C:
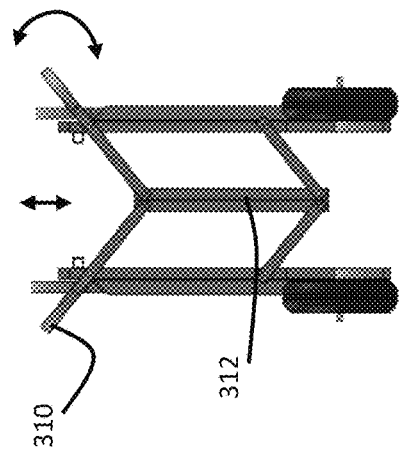
Figure 3D:
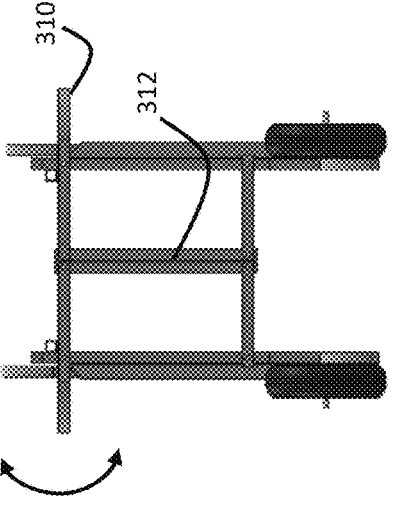
Figure 3E:
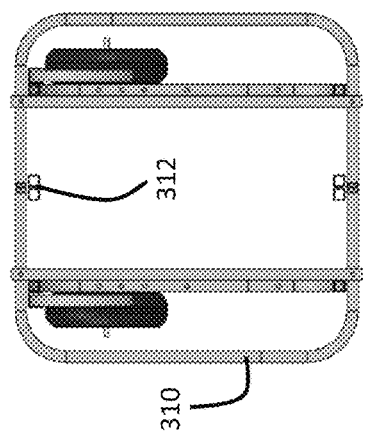
Figure 3F:
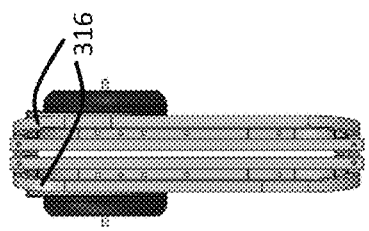
Figure 3G:
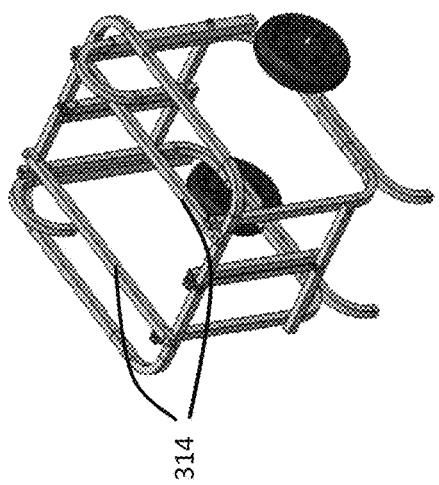

The cargo hauler has three sections, which are on either side of bag support beams 314. The wheels of the cargo hauler are relatively small to contribute to ease of carrying when the hauler is used as a tote, either folded or unfolded. The open construction of the hauler, where there is no frame or structure in the interior of the hauler, makes the frame lighter and provides more storage room, while making the hauler more easily used as a tote. Handles 316 are provided with a telescoping operation to permit the hauler to be compact, as well as easily used as a cart when handles 316 are extended. The cargo hauler becomes more narrow when folded, as shown in FIGS. 3c and 3g. Handles 316 are trapped in place when retracted and the cart is in the folded configuration, reducing the need to additionally lock handles in place.

Figure 4A:
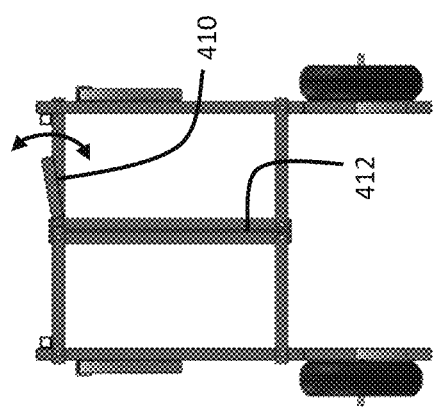
FIGS. 4a, 4b, 4c, 4d, 4e, 4f, 4g and 4h are different views of another example cargo hauler in both a folded and unfolded configuration.
Figure 4B:
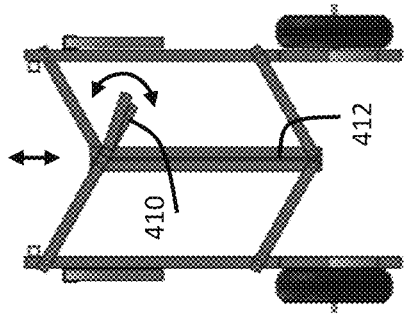
Figure 4C:
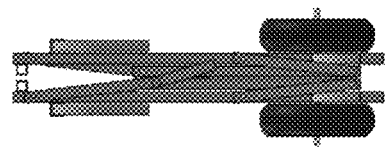
Figure 4D:
Figure 4E:
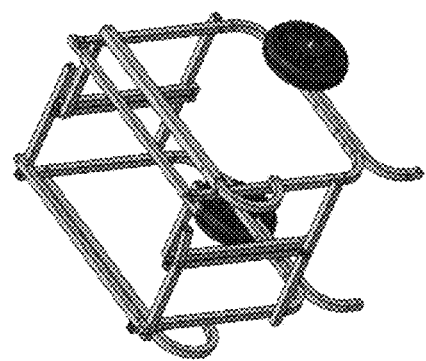
Figure 4F:
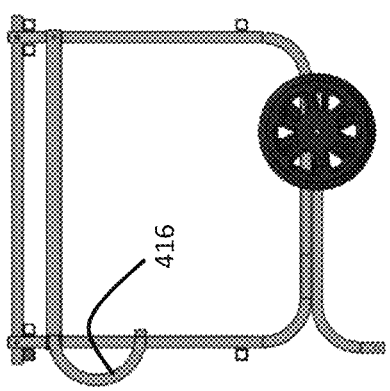
Figure 4G:
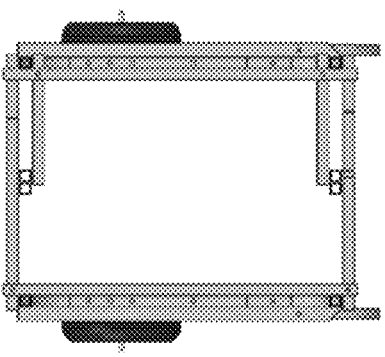
Figure 4H:
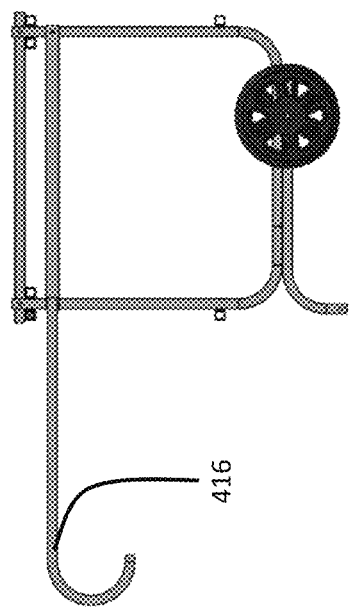

Referring now to FIGS. 4a-4h, another embodiment of a two wheeled hauler is illustrated. FIGS. 4a and 4b show a configuration for a rotating beam handle 410 that is urged downward to fold the hauler. Rotating beam handle 410 is a section that extends beyond a center region of the hauler from vertical rotating beams 412. Pushing down on rotating beam handle 410 folds the cart. The process is reversed to unfold the cart.

Handles 416 telescope for compact stowage. Placement of handles 416, as illustrated, on the outer edges of the cargo hauler, improves cart stability while hauling.

The carts illustrated in FIGS. 3a-3g and in FIGS. 4a-4h have relatively small diameter wheels to permit the folding/unfolding of the cart while loaded to be achieved more easily. The smaller wheels also tend to make the design lighter. Known carts are unable to achieve these advantageous features, since they tend to have larger wheels, and are typically unloaded to permit the cart to be folded or unfolded.

Referring now to FIGS. 5a-5j, a variation of the operating mechanism in the cart and folding designs illustrated in FIGS. 3a-3g and FIGS. 4a-4h is shown. For example, hauling handles 516 are located under rotating beam handles 510 for compact stowage. Handles 516 can be extended while the cart is loaded or unloaded, and while being folded or unfolded, which permits transport of the folded loaded cart through tight areas. This advantageous and novel feature is unavailable in known carts. Handles 516 are shaped to match the contours of rotating beam handles 510. With such a design, handles 516 do not protrude outwardly from the hauler when unextended, so that a smaller profile for the hauler can be maintained. Handles 516 are also located outboard of the wheels of the hauler, which positioning can contribute to greater stability and control during use.

Figure 5E:
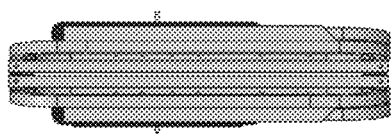
FIGS. 5a, 5b, 5c, 5d, 5e, 5f, 5g, 5h, 5i and 5j are different views of another example cargo hauler in both a folded and unfolded configuration.
Figure 5D:
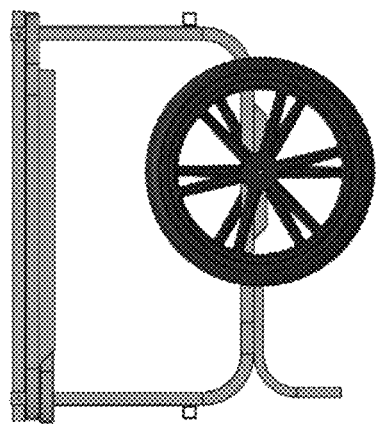
Figure 5C:
Figure 5B:
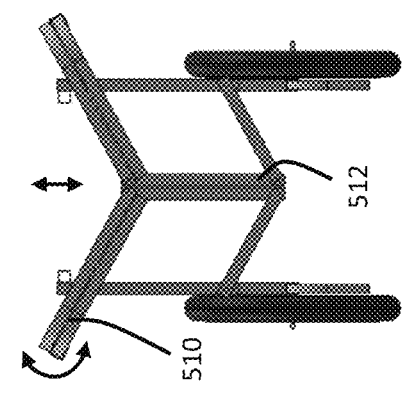
Figure 5A:
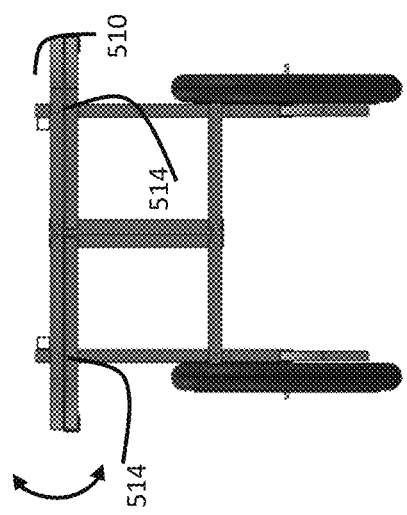
Figure 5J:
Figure 5H:
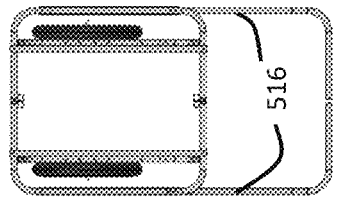

In addition, the wheels of the hauler illustrated in FIGS. 5a-5i are larger than those shown in FIGS. 3a-3g or FIGS. 4a-4h. However, the wheels are located inboard of the hauler, which permits a smaller profile for the folded hauler, as illustrated in FIGS. 5e, 5h, and 5j.

Figure 5G:
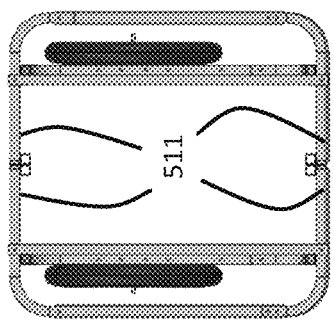
Figure 5F:
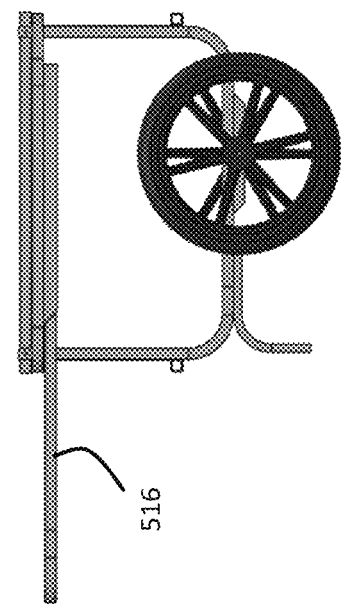

The hauler illustrated in FIGS. 5a-5j can be folded by applying an upward force on rotating beam handles 510 to urge them upward and towards each other. This movement is transferred to connected vertical rotating beams 512 by bars 511, which are pivotally connected to and pivot about pivot points 514. The pivoting movement of rotating beam handles 512 and bars 511 is the same as that exhibited by rotating beam handles 310 and 410 and their connected bars that pivot about respective pivot points. As rotating beam handles 512 are moved upward and inward, bars 511, which are pivotally connected to vertical rotating beams 512, cause vertical rotating beams 512 to move downward. In the reverse, unfolding operation, rotating beam handles 512 are moved outwardly and downwardly, and may be moved away from each other, to cause vertical rotating beams 512 to move upwardly until positioned in the unfolded configuration, as shown in FIGS. 5a, 5g and 5h. A locking mechanism or detent system (FIGS. 5a, 5f) may be provided to retain the hauler in the folded or unfolded position. Rotating beam handles 510 are fabricated using bent tubing located either side of the cart that pivotally connect to vertical rotating beams 512. Bars 511 may be considered to be a component or a part of rotating beam handles 510

Figure 5I:
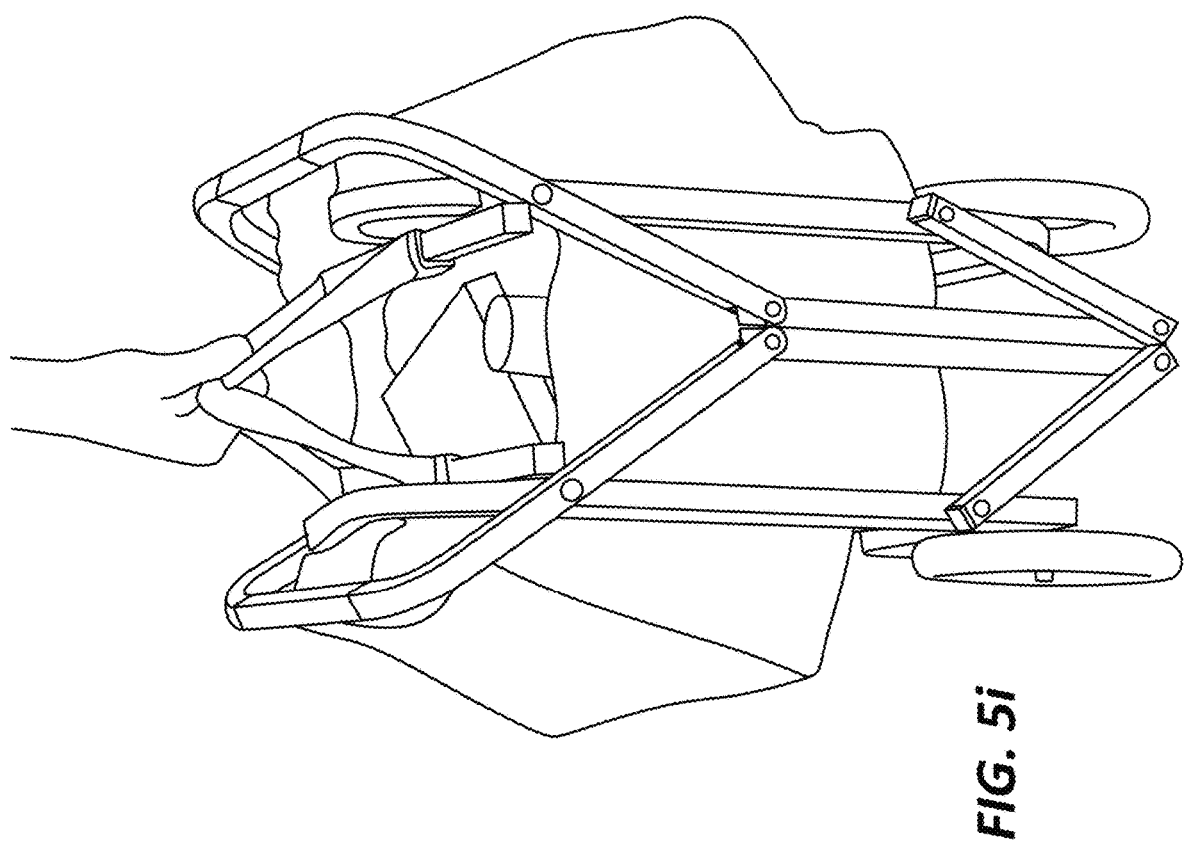
Figure 6D:
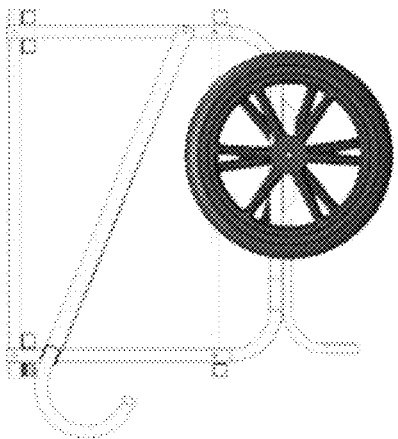
FIGS. 6a, 6b, 6c, 6d, 6e, 6f, 6g, 6h, 6i and 6j are different views of another example cargo hauler in both a folded and unfolded configuration.
Figure 6H:
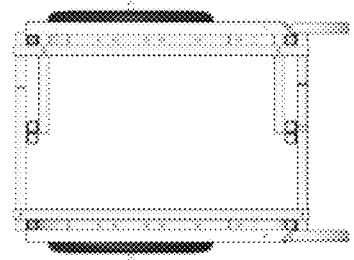
Figure 6C:
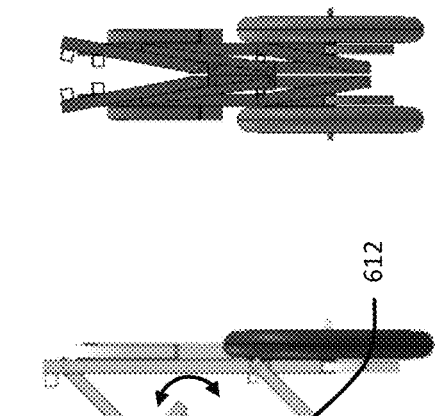
Figure 6G:
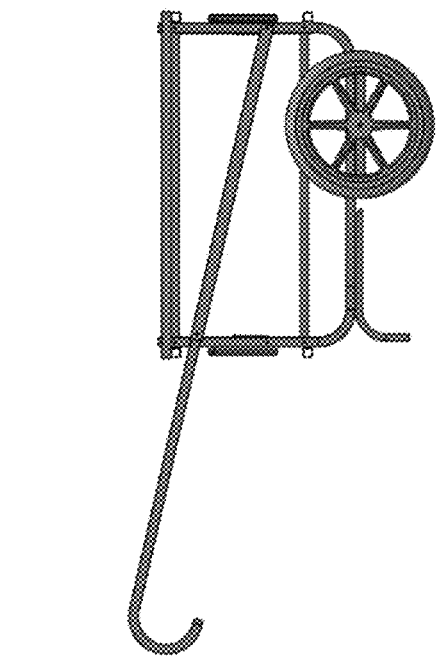
Figure 6B:
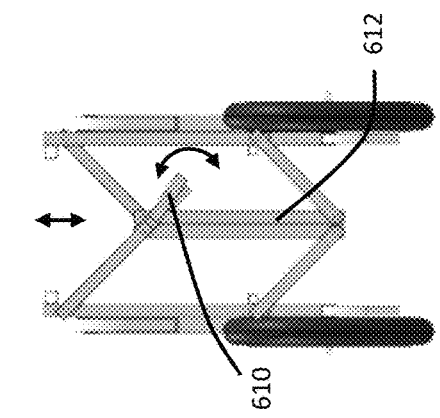
Figure 6F:
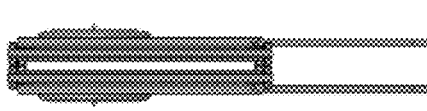
Figure 6A:
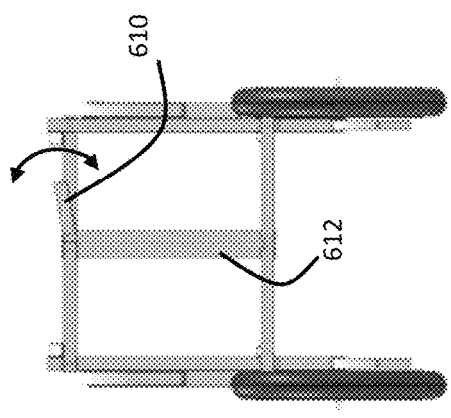
Figure 6E:

As with the haulers shown in FIGS. 3a-3g and FIGS. 4a-4h, a strap or straps (not shown) may be attached to rotating beam handles 512, which a user can gather together to lift and carry the hauler as a tote. When the strap(s) are gathered together, they pull rotating beam handles 512 together to move the hauler towards a folded position, and may also be configured to be used as backpack straps, a shoulder strap or a general carrying strap. As shown in FIG. 5i, one or more straps may also be attached to bag support beam 314 (FIG. 3e), and the equivalents shown in FIGS. 5g and 5h, for example, to be used as tote handles or backpack, shoulder or carry straps.

Figure 7:
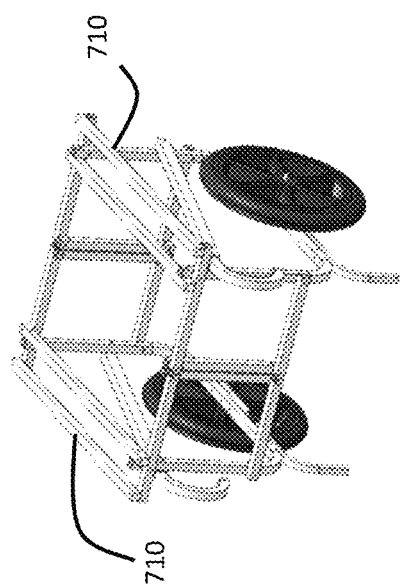
FIG. 7 is an isometric view of a cargo hauler according to another example.
Figure 6J:
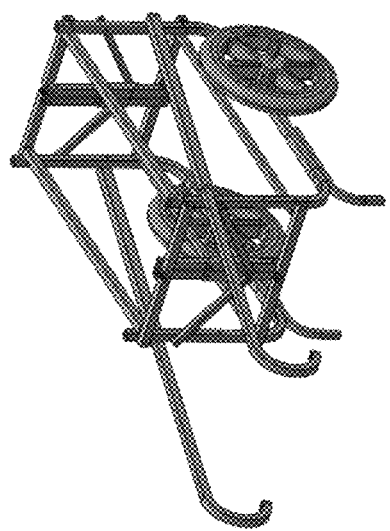
Figure 6I:
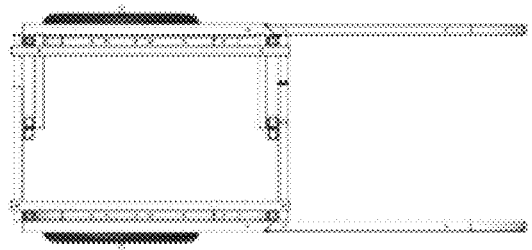
Figure 8C:
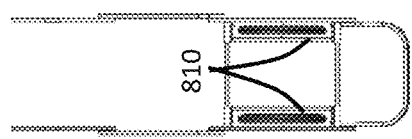
FIGS. 8a, 8b, 8c, 8d, 8e and 8f are different views of another example cargo hauler in both a folded and unfolded configuration.
Figure 8F:
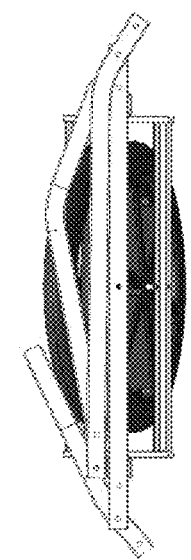
Figure 8B:
Figure 8E:
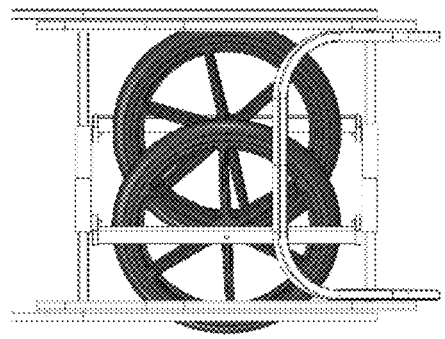
Figure 8A:
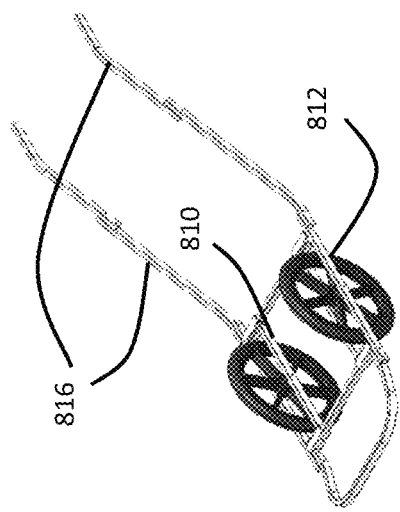
Figure 8D:
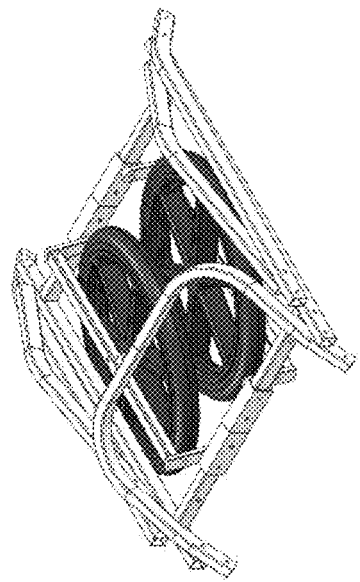

Referring now to FIGS. 6a-6j, a variation of the design illustrated in FIGS. 5a-5h and 5j is shown. Rotating beam handles 610 operates by being pushed down on the section of handle 610 that extends beyond a center of vertical rotating beams 612. Pushing down on the section of handle 610 folds the cart, while pulling up on or lifting the section of handle 610 unfolds the cart. Rather than the extension or moment being located beyond the centerline of the cart as illustrated, the moment can be located outboard of the wheel frame (FIG. 7). In this example, rotating beam handles 610 are combined or reduced in size, and are actuated with the section of handles 610 that extends past the centerline of the hauler.

Referring now to FIG. 7, a hauler design is illustrated with rotating beam handles 710 that extend outside of the hauler frame, similar to rotating beam handles 510 (FIGS. 5a and 5b). The hauler illustrated in FIG. 7 thus includes rotating beam handles 710, while not necessarily hanging side bags from them. The design in FIG. 7 can maximize a single cargo hold volume, yet provides the ease of folding, unfolding offered by the three cargo compartment designs, e.g., as shown in FIGS. 5a-5h and 5j.

Referring now to FIGS. 8a-8f, a two wheeled folding design for a hauler is illustrated. This design, as well as the single wheeled folding design, are configured to fold into a small stowed volume, suitable for being carried in a backpack, for example.

The wheels of the hauler illustrated in FIGS. 8a-8f are bolted to the interior rotating-translating beams 810 and use quick releases for the exterior or outside wheel beams 812. Handles 816 are illustrated that fold for compact stowage, and, as with other designs herein, handles 816 can telescope to extend or retract as desired. The hauler illustrated in FIGS. 8a-8f includes an aft cargo compartment, which can also fold to obtain a compact folded configuration. Three different cargo bags can be used with the hauler shown in FIGS. 8a-8f, one between hauling handles 816, another between the wheels and another in the aft cargo compartment.

Referring now to FIGS. 9a-9k, a single wheel hauler design is illustrated. The illustrated hauler design reduces fabrication expense by attaching two locking bent rotating beams 910 to the bent rectangular wheel frame structures 912 that support the wheel assembly. The curvature of bent rotating beams 910 permits the wheel assembly to store in-plane, so that when in use as a backpack, components do not protrude. Bent rotating beams 910 can lock or be secured with a securing mechanism such as a pin or bolt in a receiving opening in a deployed or unfolded configuration, as well as in a folded position. A benefit of attaching the hauling handles 914 to bent rotating beams 910 is that it increases the effective leverage of handles 914 to provide a moment. This moment provides better control and steerage.

The hauler illustrated in FIGS. 9a-9k includes cargo beams 916 that are stored in the bag support beams and can be pulled out forward and aft to permit cargo items to be hung from beams 916, or can be pushed back in to be stowed. Beams 916 can be locked in the stowed inner or pulled out orientations.

Single wheel designs, including that illustrated in FIGS. 9a-9k, are suitable for connecting to a waist belt and/or shoulder straps, as illustrated in FIGS. 2a-2c, such that the cart follows behind the person while walking or running. This configuration provides hands free hauling. The cart can also be operated as a wheel barrow, e.g., by permitting the user to grip handles 914 to control and transport the cart.

The single wheeled cart illustrated in FIGS. 9a-9k can be folded to a compact configuration suitable for, e.g., backpack transport. The cart is folded from a fully unfolded configuration by retracting telescoping hauling handles 914. Handles 914 may be rotated to align generally with bent rotating beams 910, as shown in FIG. 9f. The fore and aft extendable additional cargo beams 916 may be stowed by unlocking them from an extended position and pushing them inward to a stowed position, as shown in FIG. 9f. The locking bent rotating beams 910 can be unlocked and pivoted downward to be stowed. As shown in FIG. 9h, the left bent rotating beam 910 can be unlocked and pivoted to be stowed before the right bent rotating beam 910 is unlocked from the unfolded position and stowed. It should be understood that the right and left rotating beams 910 can be configured to operate to be stowed or unfolded in any sequence or simultaneously. The cart in the stowed or folded configuration, as illustrated in FIGS. 9g, 9i and 9k, is compacted for easily being carried, such as by being attached to a shoulder harness or backpack for transport.

Figure 10C:
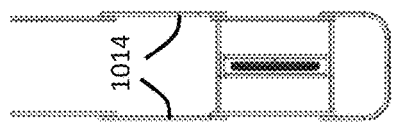
FIGS. 10a, 10b, 10c, 10d, 10e, 10f and 10g are different views of an example cargo hauler in both a folded and unfolded configuration.
Figure 10F:
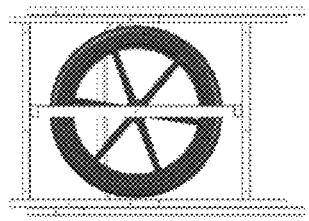
Figure 10B:
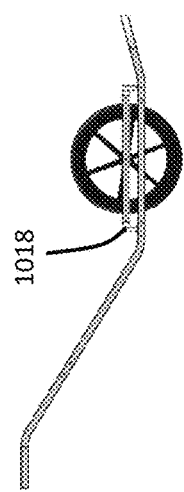
Figure 10E:
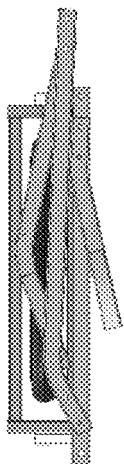
Figure 10A:
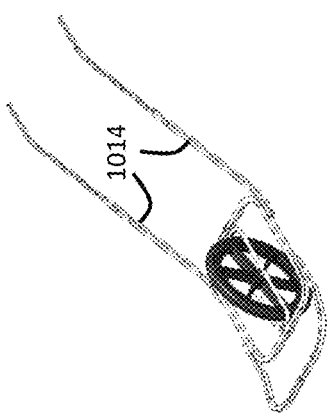
Figure 10D:
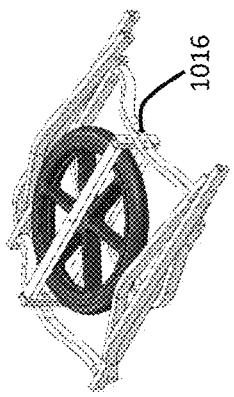
Figure 10G:
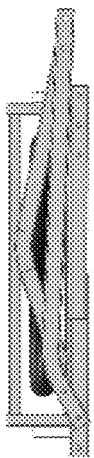

Referring now to FIGS. 10a-10g, a single wheeled foldable hauler is illustrated. The illustrated hauler has room for four compartments or bags for cargo, between handles 1014, on either side of the wheel, or in the aft cargo compartment. The wheel may be fastened to the frame with a fastener 1016 that includes a nylon washer 1018. Fastener 1016 may be a clevis pin. The frame of the hauler may be composed of sections that are welded together. The aft cargo compartment may be composed of a continuous bent component, as illustrated in FIGS. 10a-10f, or may be two separate, straight members that can fold more completely in the folded configuration, such as is illustrated in FIG. 10g.

Referring now to FIGS. 11a-11g, a single wheeled hauler design is illustrated. The hauler may be used for efficient back country cargo hauling over narrow or rough terrain. The design is narrowly tapered for light and efficient operation in back country conditions, such as may be the case for camping, hunting and other such applications. Cargo bags may be arranged in all four cargo areas. The arrangement of bags may be configured to minimize snags. For example, bags may be provided with hard bottoms that provide impact resistance for hauling over rough terrain. The hauler is configured in some examples to weigh about 11 pounds.

The wheel may be provided with a quick releases to permit the wheel to completely detach from the frame. This configuration reduces weight and provides for compact stowage, as illustrated in FIGS. 11d-11f. In the stowed configuration, the wheel is removed from the hauler using the quick release, which may be the same type of release often used for removing wheels from bicycles. The wheel is than placed within the folded hauler, with handles 1114 and extensions 1116 folded over the wheel, as illustrated in FIG. 11e, for example, to secure the wheel for backpack or shoulder strap transport.

The haulers shown in FIGS. 8a-8f, 9a-9k, 10a-10g and 11a-11g may be fitted with straps that can be used to contribute to collapsing the haulers or carrying the haulers. For example, the straps may be configured to permit the haulers to be carried like a tote or a backpack, or over the shoulder with one or more shoulder straps. Thus, as with the haulers shown in FIGS. 3a-3g, 4a-4h, 5a-5i, 6a-6j and 7, straps may be provided on the hauler or attachable to the hauler to assist with carrying the hauler as a backpack, tote or over a shoulder.

In addition to accessories for attachment to bikes and ATV's, the backwoods hauler can also be configured with skis for cross country or downhill skiers. The frames of the hauler attach at the wheel for low center of gravity. A design variation for the hauler illustrated in FIGS. 11a-11g, as well as that shown in FIGS. 10a-10g, is to arrange the frame at a higher location relative to the wheel, which may, for example, provide greater clearance for cargo.

Another application for the haulers described herein is as a wheeled transport for transporting humans or animals. The hauler can be adapted to have a seat rather than or in addition to a cargo area, or can be provided with a stretcher type structure that can suspend a canvas sheet, for example, for a person or animal to lay on for transport. As an example, the hauler illustrated in FIGS. 8a-8f or that illustrated in FIGS. 9a-9k can be modified to have an extendable platform that permits suspension of a fabric on which a body can be laid to be transported. Such a hauler design would be particularly useful to evacuate injured persons in back country terrain, where the hauler could be transported by backpack by rescue personnel, and deployed or unfolded to provide a wheeled or ski enabled stretcher that could be used to evacuate an injured person.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known processes, structures, and techniques have been shown without unnecessary detail to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional stages or functions not included in the figure.

Having described several example configurations, various modifications, alternative constructions, and equivalents may be used without departing from the spirit of the disclosure. For example, the above elements may be components of a larger system, wherein other structures or processes may take precedence over or otherwise modify the application of the invention. Also, a number of operations may be undertaken before, during, or after the above elements are considered. Accordingly, the above description does not bound the scope of the claims.

What is claimed is:

1. A foldable transport device for transporting loads over a transport surface, comprising:
   a support member for supporting the device on the transport surface;
   a frame coupled to the support member, the frame being foldable and configured to support a load and including a first outer load beam and a second outer load beam being distal from the first outer load beam, the first outer load beam and the second outer load beam being parallel to each other when the frame is in a fully folded state and in a fully unfolded state, and a first vertical load beam and a second vertical load beam being distal from the first vertical load beam;
   a handle connected to the frame;
   at least two rotating joints in the frame and configured to be actuated to fold or unfold the frame;
   the at least two rotating joints being spaced across from each other in the frame at a same distance when the frame is fully folded or fully unfolded;
   a substantially central vertical beam coupled to a rotating joint, the substantially central vertical beam being displaced vertically when the frame is folded or unfolded;
   wherein the first vertical load beam, the second vertical load beam, and the substantially central vertical beam being parallel when the frame is in a fully folded state and in a fully unfolded state; and
   wherein the first vertical load beam, the second vertical load beam, and the substantially central vertical beam being perpendicular to the first outer load beam and the second outer load beam when the frame is in a fully folded state and in a fully unfolded state.

2. The device according to claim 1, wherein the support member further comprises a wheel.

3. The device according to claim 2, further comprising a plurality of support members, each of which is a wheel.

4. The device according to claim 1, wherein the handle further comprises a handle that is one or more of telescoping, collapsible or foldable.

5. The device according to claim 1, further comprising the frame being supported by the support member for transport.

6. The device according to claim 1, further comprising an attachment device for attaching the handle to a user for hands-free transport.

7. The device according to claim 6, wherein the attachment device is one or more of a waist belt or a shoulder harness.

8. The device according to claim 1, wherein the rotating joint is configured to be actuated to pivot about a point of the frame.

9. The device according to claim 8, further comprising another rotating joint coupled to the rotating joint, and configured to be actuated when the rotating joint is actuated.

10. The device according to claim 1, wherein the support member comprises at least two wheels, and wherein the two wheels are drawn closer to each other when the frame is folded.

11. The device according to claim 1, further comprising a rotating handle beam connected to the rotating joint, the rotating handle beam being configured to receive an urging force to actuate the rotating joint.

12. The device according to claim 1, further comprising a load compartment suspended from the frame.

13. A foldable transport device for transporting loads over a transport surface, comprising:
   a support member with a largest dimension for supporting the device on the transport surface;
   a frame coupled to the support member, the frame being configured to support a load and including a first outer load beam and a second outer load beam being distal from the first outer load beam, the first outer load beam and the second outer load beam being parallel to each other when the frame is in a fully folded state and in a fully unfolded state, and a first vertical load beam and a second vertical load beam being distal from the first vertical load beam;
   a handle connected to the frame;
   at least two rotating joints in the frame and configured to be actuated to permit the support member to be folded such that the largest dimension aligns with at least portions of the frame to obtain a compact folded configuration for the foldable transport device; and the at least two rotating joints being spaced across from each other in the frame at a same distance when the frame is fully folded or fully unfolded;

a substantially central vertical beam coupled to a rotating joint, the substantially central vertical beam being displaced vertically when the frame is folded or unfolded;

wherein the first vertical load beam, the second vertical load beam, and the substantially central vertical beam being parallel when the frame is in a fully folded state and in a fully unfolded state; and wherein the first vertical load beam, the second vertical load beam, and the substantially central vertical beam being perpendicular to the first outer load beam and the second outer load beam when the frame is in a fully folded state and in a fully unfolded state.

14. The device according to claim 13, wherein the compact folded configuration is sufficiently compact to be carried on a user's back or around a user's shoulder.

15. The device according to claim 13, wherein the handle is outboard of the wheels to increase stability and control.

\* \* \* \* \*